April 3, 1951 A. B. LAUTERBACH 2,547,330
FISHING REEL
Filed Dec. 12, 1947 2 Sheets-Sheet 1
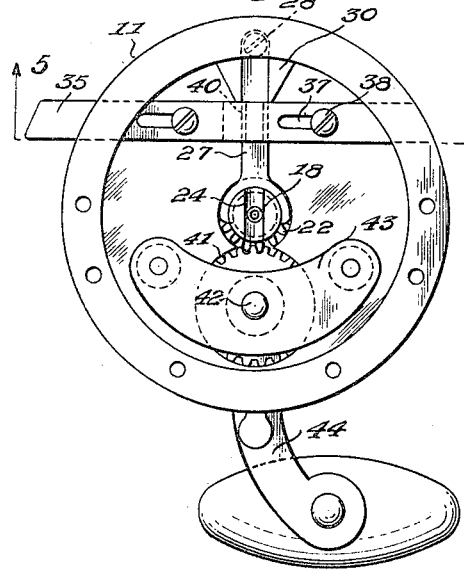
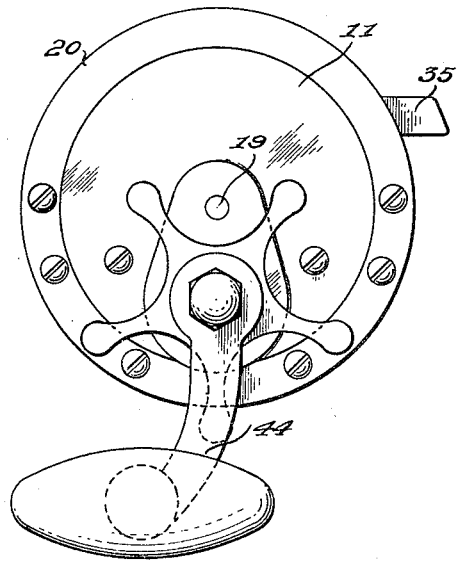
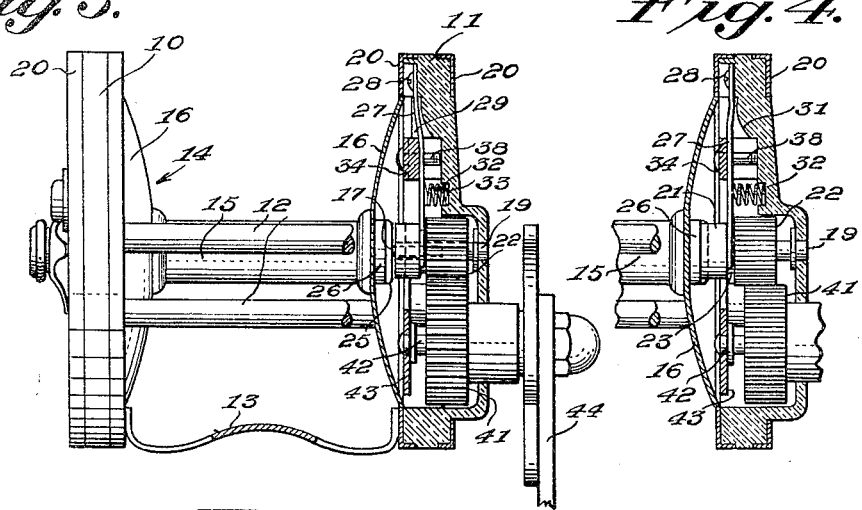
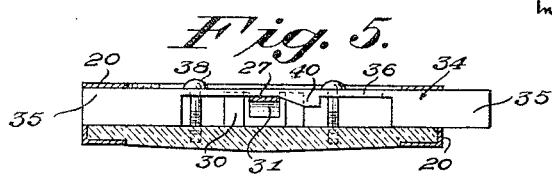
INVENTOR.
Alexander B. Lauterbach
BY George E. Cook
atty

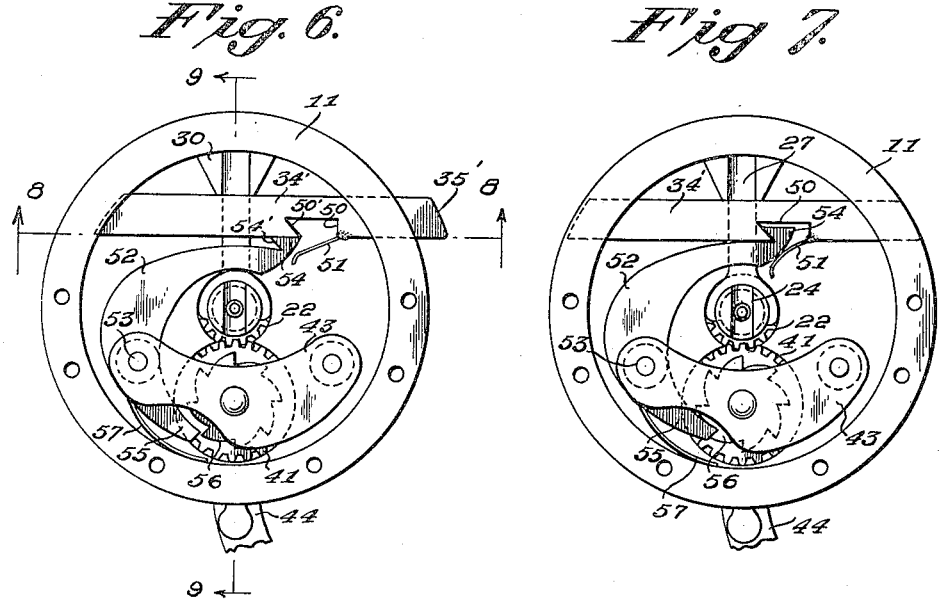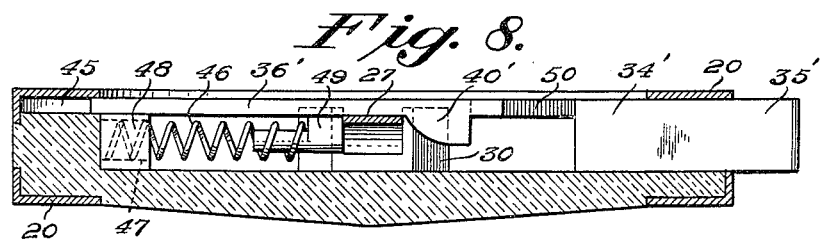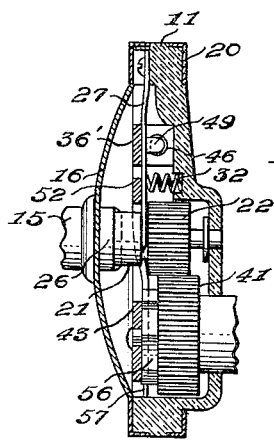

Patented Apr. 3, 1951

2,547,330

UNITED STATES PATENT OFFICE 2,547,330

FISHING REEL

Alexander B. Lauterbach, Utica, N. Y., assignor to Horrocks-Ibbotson Company, Utica, N. Y., a corporation of New York Application December 12, 1947, Serial No. 791,345

1 Claim. (Cl. 242—84.7)

This invention relates to fishing reels and more particularly to the type known as free spooling reels.

The present invention is an improvement over the reel construction of my prior Patent No. 2,120,334, issued June 14, 1938 and has as a primary object improved clutch actuating mechanism whereby the spool is connected or disconnected with or from the crank operated mechanism with greater ease and certainty by a fisherman.

A further object of the invention is the provision of a reel of the above noted character which is simple and strong in construction, durable and reliable in operation and which, in accordance with one embodiment thereof includes mechanism for automatically connecting the spool for rotation with the crank operated gear subsequent to the disconnection of the spool from driving connection with the gear by manually operable means.

Other objects and advantages of the invention will become apparent in the course of the following detailed description, taken in connection with the accompanying drawings, wherein Fig. 1 is an inside elevational view of the right hand head plate of the reel with which the present invention is associated.

Fig. 2 is an outside elevational view of the right hand head plate with the operating crank associated therewith and showing screws by which the plate is connected to the usual cross bars spanning the space between the left hand and right hand head plates.

Fig. 3 is a view of the reel in side elevation with the right hand head plate in substantially diametrical vertical section.

Fig. 4 is a vertical sectional view corresponding to the right hand portion of Fig. 3, but showing the clutch and clutch actuating mechanism in a different position.

Fig. 5 is a horizontal sectional view in the plane of line 5—5 on Fig. 1.

Fig. 6 is an elevational view corresponding with Fig. 1 but disclosing a modified embodiment of the invention.

Fig. 7 is a view similar to Fig. 6 but showing the parts in a different position.

Fig. 8 is an enlarged horizontal sectional view in the plane of line 8—8 on Fig. 6, spring 51 being omitted.

Fig. 9 is a vertical sectional view in the plane of line 9—9 on Fig. 6.

Referring now in detail to the drawings, and first to Figures 1 to 5 wherein the first embodiment of the invention is illustrated, the reel includes a left head plate 10 and a right head plate 11 which are interconnected in the usual manner by cylindrical bars 12 and a member 13 by which the reel is mounted upon the butt end of a fishing rod.

Revolvably mounted between the head plates 10 and 11 is the reel spool 14 having a hub 15 and opposite end plates 16. The connection of the hub 15 with the left head plate 10 is not shown but is as disclosed in my said patent and forms no part of the present invention.

The right hand end of the spool hub 15 is provided with a spindle 17 having bearing in a bore 18 of a stub shaft 19. At this point it is to be noted that the head plates preferably each include a transparent body portion as indicated and opposed flanged rings 20 are disposed at the peripheries of the body portions, and such rings are seated in depressed portions such that their outer surfaces are flush with the outer surfaces of the body portions.

Slidably disposed on the fixed stub shaft 19 is a longitudinally movable clutch member 21 which is unitary with a pinion 22 and between which is a circular race 23.

The clutch member 21 is preferably cylindrical and is provided with a diametrical slot 24 for receiving the rib 25 of a cooperating clutch member in the form of a hub portion 26 projecting from the concave face of the right hand spool plate 16.

A clutch shifting arm 27 has one end thereof secured to the body of plate 11 as by means of a screw 28 and the opposite end of such arm is forked and rests in the movable clutch member race 23. The arm 27 preferably rests in a slot in the plate body portion as well as an alined slot 29 in a lug 30 integral with the body portion and the bottom wall of the slot 29 is rounded as at 31 to accommodate the arm in its flexing movements.

The clutch shifting arm is normally urged in a direction to operatively engage the clutch members 21 and 26 (Fig. 4) by a spring 32 having one end thereof bearing on the arm and the other end thereof resting in a recess 33 in the head plate 11.

The movement of the arm to clutching position by means of spring 32 is limited by means of a bar 34 which is supported by the plate 11 for longitudinal shifting movement and which is constructed for urging the arm 27 in an opposite direction against the action of spring 32 to disengage the clutch members for free spooling as is indicated in Fig. 3.

The bar 34 includes opposite end portions 35 which are slidably disposed in openings in head plate 11 and the bar is preferably disposed at right angles to the arm 27.

The bar is of substantial depth at its end portions 25 in the provision of finger push members and the bar intermediate such end portion includes a substantially thin portion 36 as shown in Fig. 5 and which overlies the arm 27. The intermediate portion 36 is provided with elongated slots 37 through which project screws 38 having their shank ends threaded into the plate 11 and the heads of the screws bearing on the outer face of the portion 36. This screw and slot connection provides for limited longitudinal movement of the bar 34.

The position of the bar in Fig. 5 corresponds to Fig. 4 wherein the arm 27 is urged by spring 32 to engage the clutch member, and the bar portion 36 limits the movement of the shift arm in this direction.

The portion 36 of bar 34 is provided with a cam lug 40 which upon movement of bar 34 to the position in Fig. 1 urges the arm 27 to the right as in Fig. 3 with the result that the clutch members 21 and 26 are disengaged for a free spooling operation.

The pinion 21 is in driving connection with a gear 41 rotatably supported on a fixed shaft 42 having one end secured in a plate 43, and the gear 41 is rotatable by a crank handle 44 in the usual manner.

It should be appreciated from the foregoing that a free spooling reel structure is provided having clutch shifting mechanism which is operable by means whereby any possible slipping of the fingers as may readily occur in a lever structure according to my patent, is avoided and furthermore that the operating parts are of relatively simple construction whereby the structure is not liable to get out of operation.

A modified embodiment of the invention is shown in Figs. 6 to 9 and which includes means for automatically engaging the clutch members upon initial rotation of gear 41 by the crank handle 44.

In this embodiment, the bar 34' includes a single finger operable end portion 35' which is movable through the head plate as indicated in Fig. 8. This bar 34' includes a major relatively thin portion 36' with the free end thereof slidable in a recess 45, the range of sliding movement of the bar being shown in Figs. 6 and 7 wherein the clutch members are engaged and disengaged respectively.

The bar 34' is normally retained in the position of Figs. 6 and 8, with the clutch members engaged, by means of a spring 46 having one end thereof seated in a recess 47 in a projection 48 unitary with the head plate 11, and the opposite end of the spring engages a lug 49 fixed to and depending from the bar portion 36'. The lug 49 normally engages one edge of arm 27 to limit movement of the bar 34' to the position of Fig. 8. The bar 34' is provided with a cam lug 40' and an undercut notch 50 together with a spring 51 projecting from one corner of the notch.

A lever 52 is pivotally connected intermediate its ends beneath plate 43 as at 53, one end of the lever being provided with a tooth 54 having an edge normally resting on the edge of bar portion 36' adjacent notch 50 and having an angular edge for cooperation with a corresponding edge of the undercut notch 50, such cooperating edges being designated 54' and 50' respectively. The opposite end of lever 52 comprises a square ended finger 55 engageable with successive teeth of a ratchet wheel 56 suitably secured for rotation with the gear 41. A spring 57 normally urges lever 52 counter-clockwise for engagement of tooth 54 with bar 34'.

In Fig. 6 the parts are shown in clutch engaging position. When it is desired to disengage the clutch members by means of shift arm 27, the bar portion 35' is engaged by the thumb or a finger and the bar 34' moved to the position of Fig. 7, whereupon cam lug 40' will ride over arm 27 and move same to disengage the clutch members. At the same time, the tooth 54 will be urged by spring 57 into the notch 50 and spring 51 will urge the edges 50' and 54' into engagement, and the finger 55 will drop into contact with an end of one of the ratchet teeth as in Fig. 7, and the reel will then be conditioned for a free spooling operation.

When it is again desired to engage the clutch members, the crank handle 44 is initially rotated whereupon the ratchet wheel 56 in its counter-clockwise rotation will urge the lever 52 clockwise and withdraw tooth 54 from within the notch 50, and spring 46 will thereupon urge the bar 34' to its normal position of Figs. 6 and 8.

It should be appreciated that this second embodiment of my invention is a marked improvement over structures of this kind in that the separate operation of clutching the reel is eliminated.

While I have disclosed but certain specific structural embodiments of my invention, such are to be considered as illustrative only, and not restrictive, the scope of the invention being defined in the subjoined claim.

What I claim and desire to secure by U. S. Letters Patent is:

In a free spool reel, a left head plate, a right head plate, a spool having circular end plates disposed between and rotatably supported by the head plates, a clutch member fixed to the end plate of the spool adjacent the right head plate and co-axially of the spool, a second clutch member and a pinion unitary therewith rotatably supported by the right head plate and being mounted for axial sliding movement relative to the fixed clutch member, a drive gear rotatably supported by the right head plate and being in driving engagement with said pinion, an elongated flexible clutch member shifting arm having one end secured to the right head plate and the other end forked and operatively engaged in a race between the slidable clutch member and pinion; the improvement in means for moving the arm laterally to effect engagement and disengagement of the clutch members comprising a spring disposed between the right head plate and one side of the arm for normally urging same in one direction to move the slidable clutch member into operative engagement with the fixed clutch members, a bar slidably supported by the right head plate and bearing on the opposite side of the arm, and a cam lug on said bar engageable with said arm to move same in an opposite direction against the action of said spring to disengage said clutch members, a spring cooperating with said right head plate and said bar for normally urging same in one direction with said clutch members engaged, a notch in one edge of said bar, a ratchet wheel supported by and rotatable with said gear, a lever pivotally supported intermediate its ends by said right head plate, one end of said lever having a notch engageable foot normally resting on the edge of said bar adjacent said notch, spring means urging said lever in a direction to urge said foot into said notch upon movement of said bar to a position in which the cam lug engages the arm, the other end of said lever having a square ended finger engageable with a tooth of said ratchet wheel when said lever tooth is in said notch, and the face of an adjacent tooth of the ratchet wheel engaging said finger upon rotation of the gear and ratchet wheel to move said lever tooth out of said notch for movement of said bar to normal position by means of said spring.

ALEXANDER B. LAUTERBACH.

REFERENCES CITED

The following references are of record in the file of this patent:

UNITED STATES PATENTS

| Number | Name | Date |
|---|---|---|
| 1,002,352 | Wisenberg | Sept. 5, 1911 |
| 1,087,149 | Stanley | Feb. 17, 1914 |
| 2,129,386 | Schafer | Sept. 6, 1938 |
| 2,130,581 | Case | Sept. 20, 1938 |